US012742668B2

(12) United States Patent
Rosser et al.

(10) Patent No.: US 12,742,668 B2
(45) Date of Patent: Sep. 22, 2026

(54) METHOD AND CONTROLLER FOR CONTROLLING A FLUID-FLOW SENSOR

(71) Applicant: Flusso Limited, Cambridgeshire (GB)

(72) Inventors: Chris Rosser, Cambridgeshire (GB); Jon Callan, Cambridgeshire (GB)

(73) Assignee: FLUSSO LIMITED, Cambridgeshire (GB)

( * ) Notice: Subject to any disclaimer, the term of this patent is extended or adjusted under 35 U.S.C. 154(b) by 202 days.

(21) Appl. No.: 18/167,345

(22) Filed: Feb. 10, 2023

(65) Prior Publication Data

US 2024/0157051 A1 May 16, 2024

(30) Foreign Application Priority Data

Nov. 15, 2022 (GB) .................................. 2217055.9

(51) Int. Cl.
*G01F 1/696* (2006.01)

(52) U.S. Cl.
CPC .................................. *G01F 1/696* (2013.01)

(58) Field of Classification Search
CPC ................................................ G01F 1/68–699
See application file for complete search history.

(56) References Cited

U.S. PATENT DOCUMENTS 3,992,940 A 11/1976 Platzer, Jr.
6,460,411 B1 10/2002 Kersjes et al.
8,820,175 B1 * 9/2014 Ahmed .................. G01F 1/688 73/861.04
11,073,415 B2 * 7/2021 Udrea .................... G01N 27/14
11,492,903 B2 * 11/2022 Challener ............... E21B 36/04
2016/0216144 A1 7/2016 Figi et al.
2018/0143051 A1 5/2018 Bentley et al.
2021/0116281 A1 4/2021 Udrea et al.
2021/0116282 A1 4/2021 De Luca et al.
2021/0356305 A1 11/2021 Dalberg et al.
2022/0283007 A1 9/2022 Speldrich et al.

OTHER PUBLICATIONS

E. Yoon, "An integrated mass flow sensor with on-chip CMOS interface circuitry", Electron Devices, IEEE Transactions on, vol. 39, pp. 1376-1386, 1992.
Graaf And, "Surface-micromachined thermal conductivity detectors for gas sensing", 2012 IEEE International Instrumentation and Measurement Technology Conference Proceedings, pp. 1861-1864.
Huijsing, et al., "Monolithic integrated direction-sensitive flow sensor", Electron Devices, IEEE Transactions on, vol. 29, pp. 133-136, 1982.
Kersjes, et al., "An integrated sensor for invasive blood-velocity measurement", Sensors and Actuators A: Physical, vol. 37, pp. 674-678, 1993.

(Continued)

*Primary Examiner* — Justin N Olamit
(74) *Attorney, Agent, or Firm* — FisherBroyles, LLP

(57) ABSTRACT

A method for controlling a fluid-flow sensor in the presence of a flowing fluid, the method comprising: applying an electrical bias to the heater element of the fluid-flow sensor, determining a phase of the flowing fluid, and modifying the electrical bias according to the phase of the flowing fluid. A controller for a fluid-flow sensor is also described.

4 Claims, 5 Drawing Sheets

(56) References Cited

OTHER PUBLICATIONS

Kuklinski, et al., “Integrated-circuit bipolar transistor array for fluid-velocity measurements”, Medical and Biological Engineering and Computing, vol. 19, pp. 662-664, 1981.
Kuo, et al., “Micromachined Thermal Flow Sensors—A Review”, Micromachines, vol. 3, pp. 550-573, 2012.
Lofdahl, et al., “A sensor based on silicon technology for turbulence measurements”, Journal of Physics E: Scientific Instruments, vol. 22, p. 391, 1989.
Moser, et al., “Silicon gas flow sensors using industrial CMOS and bipolar IC technology”, Sensors and Actuators A: Physical, vol. 27, pp. 577-581, 1991.
Nguyen, “Micromachined flow sensors—A review”, Microfluidics and nanofluidics, vol. 6, pp. 333-346, 2009.
Qin-Yi, “A novel CMOS flow sensor with constant chip temperature (CCT) operation”, Sensors and actuators, vol. 12, pp. 9-21, 1987.
Sabate, et al., “Multi-range silicon micromachined flow sensor”, Sensors and Actuators A: Physical, vol. 110, pp. 282-288, 2004.
Van Der Weir, et al., “A liquid velocity sensor based on the hot-wire principle”, Sensors and Actuators A: Physical, vol. 37, pp. 693-697, 1993.
Van Oudheusden, “Silicon flow sensors”, Control Theory and Applications, IEE Proceedings D, 1988, pp. 373-380.
Van Oudheusden, “Silicon thermal flow sensors, Silicon thermal flow sensors,” Sensors and Actuators A: Physical, vol. 30, pp. 5-26, 1992.
Van Oudheusden and Huijsing, “Integrated flow friction sensor”, Sensors and Actuators, vol. 15, pp. 135-144, 1988.
Van Putten, “An integrated silicon double bridge anemometer”, Sensors and Actuators, vol. 4, pp. 387-396, 1983.
Van Putten and Middelhoek, “Integrated silicon anemometer”, Electronics Letters, vol. 10, pp. 425-426, 1974.
Wang, et al., “MEMS-based gas flow sensors”, Microfluidics and nanofluidics, vol. 6, pp. 333-346, 2009.
EP search report for corresponding EP application 23208912.8, dated Mar. 27, 2024, 7 pages.

* cited by examiner

METHOD AND CONTROLLER FOR CONTROLLING A FLUID-FLOW SENSOR

CROSS-REFERENCES TO OTHER APPLICATIONS

This application claims priority to U.K. patent application No. 2217055.9, for "METHOD AND CONTROLLER FOR CONTROLLING A FLUID-FLOW SENSOR" filed on Nov. 15, 2022, which is hereby incorporated by reference in its entirety for all purposes.

FIELD OF THE DISCLOSURE

This present disclosure relates to a method for controlling a fluid-flow sensor, and to a controller for a fluid-flow sensor. The fluid-flow sensor may be a micro-machined sensor capable of measuring multiphase flow of liquids and gases, particularly but not exclusively, the disclosure may relate to a fluid flow sensor having a heater formed within a discontinuous dielectric membrane for sensing properties of a fluid flow or components of a fluid based on thermal conductivity properties.

BACKGROUND

Thermal fluid flow sensors utilise the thermal interaction between the sensor itself and the fluid. Depending upon the physical phenomena governing the interaction, flow sensors can be classified into the following three categories:

(i) anemometric sensors that measure the convective heat transfer induced by fluid flow passing over a heated element;

(ii) calorimetric sensors that detect the asymmetry of the temperature profile generated by a heated element and caused by the forced convection of the fluid flow; and (iii) time of flight (ToF) sensors that measure the time elapsed between the application and the sensing of a heat pulse.

Reviews of thermal fluid flow sensor have been published in (B. Van Oudheusden, "Silicon flow sensors," in Control Theory and Applications, IEE Proceedings D, 1988, pp. 373-380; B. Van Oudheusden, "Silicon thermal flow sensors," Sensors and Actuators A: Physical, vol. 30, pp. 5-26, 1992; N. Nguyen, "Micromachined flow sensors-A review," Flow measurement and Instrumentation, vol. 8, pp. 7-16, 1997; Y.-H. Wang et al., "MEMS-based gas flow sensors," Microfluidics and nanofluidics, vol. 6, pp. 333-346, 2009; J. T. Kuo et al., "Micromachined Thermal Flow Sensors-A Review," Micromachines, vol. 3, pp. 550-573, 2012). Further background can also be found in U.S. Pat. No. 6,460,411 by Kersjes et al.

In A. Van Putten and S. Middelhoek, "Integrated silicon anemometer," Electronics Letters, vol. 10, pp. 425-426, 1974 and A. Van Putten, "An integrated silicon double bridge anemometer," Sensors and Actuators, vol. 4, pp. 387-396, 1983 resistor based anemometers are integrated on chip within Wheatstone bridge configurations. B. Van Oudheusden and J. Huijsing, "Integrated flow friction sensor," Sensors and Actuators, vol. 15, pp. 135-144, 1988 propose a thermal flow sensor, calibrated for friction measurements, wherein thermocouples in addition to heating resistors and an ambient temperature monitoring transistor are integrated on chip. J. H. Huijsing et al., "Monolithic integrated direction-sensitive flow sensor," Electron Devices, IEEE Transactions on, vol. 29, pp. 133-136, 1982, W. S. Kuklinski et al., "Integrated-circuit bipolar transistor array for fluid-velocity measurements," Medical and Biological Engineering and Computing, vol. 19, pp. 662-664, 1981, U.S. Pat. No. 3,992,940 by Platzer and T. Qin-Yi and H. Jin-Biao, "A novel CMOS flow sensor with constant chip temperature (CCT) operation," Sensors and actuators, vol. 12, pp. 9-21, 1987 are examples of transistor based anemometers. One drawback of the previously mentioned citations is that they have a high power dissipation, low sensitivity and slow dynamic response of the sensor.

In D. Moser et al., "Silicon gas flow sensors using industrial CMOS and bipolar IC technology," Sensors and Actuators A: Physical, vol. 27, pp. 577-581, 1991 an array of seven npn transistors are used as heating elements and suspended on a crystal silicon cantilever beam for effective thermal isolation. An ordinary pn diode measures the temperature on the beam. The voltage across nineteen silicon/aluminium thermocouples, with hot junctions on the beam and cold junctions on the substrate, is correlated to the gas flow velocity while the heater is driven at constant power. This device suffers from mechanical fragility and vibration sensitivity.

Similarly, L. Lofdahl et al., "A sensor based on silicon technology for turbulence measurements," Journal of Physics E: Scientific Instruments, vol. 22, p. 391, 1989 present a heating resistor and a heater temperature sensing diode integrated on a cantilever beam. Polyimide is used as thermal isolation material between the beam and the substrate, which affects the mechanical robustness of the beam.

In R. Kersjes et al., "An integrated sensor for invasive blood-velocity measurement," Sensors and Actuators A: Physical, vol. 37, pp. 674-678, 1993 a polysilicon heater, driven at constant heating power, and a first diode, used for heater temperature monitoring, are placed on a silicon membrane. A second diode is placed on the substrate for ambient temperature monitoring. A similar sensor is also presented in A. Van der Wiel et al., "A liquid velocity sensor based on the hot-wire principle," Sensors and Actuators A: Physical, vol. 37, pp. 693-697, 1993, where more transistors, in diode configuration, are connected in series in order to improve the temperature sensitivity of the sensor. The use of silicon as membrane material results in high power dissipation, low sensitivity and slow dynamic response of the sensor.

In U.S. Pat. No. 6,460,411, by Kersjes et al., a silicon membrane perforated by slots of thermally insulating material is proposed but has a more complex fabrication process.

In US20160216144A1 a CMOS flow sensor is disclosed, comprising a heating element and a number of thermocouples. The thermocouples provide an additional thermal dissipation path within the membrane, thus increasing the power dissipation, lowering the sensitivity and slowing down the dynamic response of the sensor.

In E. Yoon and K. D. Wise, "An integrated mass flow sensor with on-chip CMOS interface circuitry," Electron Devices, IEEE Transactions on, vol. 39, pp. 1376-1386, 1992 a multi-measure flow sensor is proposed. However, the manufacturing process is not fully CMOS compatible, and thus more expensive than a fully CMOS process.

N. Sabaté et al., "Multi-range silicon micromachined flow sensor," Sensors and Actuators A: Physical, vol. 110, pp. 282-288, 2004 present a multirange flow sensor using nickel resistors as temperature sensors positioned at different distances from the nickel resistive heater. Nickel is not a standard CMOS material, making the sensor fabrication process more expensive than a fully CMOS process.

In G. De Graaf and R. F. Wolffenbuttel, "Surface-micromachined thermal conductivity detectors for gas sensing."

2012 IEEE International Instrumentation and Measurement Technology Conference Proceedings, pp. 1861-1864, a structure comprising a heater for temperature control and two thermopiles for sensing embedded in a dielectric pierced membrane is presented. The membrane is obtained by front-etching through the holes that have no influence on the device working behaviour. This process is not compensated for the effects of flow.

US20180143051A1 presents a structure using four resistors in a full bridge configuration, with at least one external element not affected by the flow to be coupled with any of the previous ones. This design requires a complex circuitry for the read-out, and the use of big resistances to increase the output signal that strongly undermine the insulation provided by the membrane.

Traditional flow sensors based on a hot wire embedded in the membrane are known. Efforts have also been made to quantify the composition of the fluids by using thermal conductivity sensors.

SUMMARY

Presently available sensors have, among others, the following disadvantages:

- Inability to accurately measure the flow rate of multiphase flows that may switch unexpectedly between liquid and gas
- high power dissipation, particularly when measuring the flow of liquids
- poor accuracy and precision, particularly when measuring the flow of gases
- fragility when exposed to liquids
- fragility when exposed to large changes in pressure
- complex fabrication processes;
- manufacturing processes that are not fully CMOS compatible; and
- manufacturing processes that are expensive.

As a result of these disadvantages currently available flow sensors are predominantly designed to measure only gases or, alternatively, only liquids. When a thermal gas flow sensor is exposed to liquid it ceases to measure accurately and, in some cases, will be permanently damaged. When a thermal liquid flow sensor is exposed to gas flow the reading will be inaccurate (or zero).

The devices of the present disclosure are advantageous over the state-of-the-art devices for at least the following reasons:

- the sensor can accurately measure the flow rate of liquid or gas
- when the flow suddenly changes from gas to liquid or liquid to gas the transient time when readings are not accurate is exceptionally short
- the sensor is not damaged by exposure to even large quantities of liquid
- the sensor is robust to sudden large changes in pressure (for example due to the fluid in the system changing from gas to liquid)
- the sensor has very low power consumption both when measuring liquid flow and gas flow
- the sensor power consumption does not change greatly between measuring liquid and gas
- the devices are fully CMOS compatible and therefore can be manufactured using fully CMOS compatible processes.

The presently disclosed sensor, termed multiphase flow and thermal conductivity sensor is able to measure (i) the convective heat transfer induced by a multiphase flow passing over a heated element; and (ii) whether the fluid flow is liquid or gas based on the different thermal conductivity and/or heat capacity of each of the components of the fluid flow.

Aspects and preferred features are set out in the accompanying claims.

The present disclosure relates to a sensor and connected controller. The controller may be integrated with the sensor on the same substrate. Alternatively, the controller may be integrated with the sensor within the same component package. Alternatively, the controller may be separate from the sensor component but connected to it by wires, traces or other electrical connections.

According to the present disclosure there is provided a method for controlling a fluid-flow sensor in the presence of a flowing fluid. The method may comprise: applying an electrical bias to the heater element of the fluid-flow sensor; determining a phase of the flowing fluid; and modifying the electrical bias according to the phase of the flowing fluid.

For example, the phase of a flowing fluid may be a liquid or a gas. In some examples, the flowing fluid may undergo a change of phase (e.g. from liquid to gas, or from gas to liquid) while flowing.

Advantageously, the method may enable a fluid-flow sensor to be capable of determining a rate and/or direction of fluid-flow regardless of the phase of the flowing fluid.

In some examples, the method may comprise switching off the fluid-flow sensor (i.e. reducing the bias to zero) when the fluid is in a liquid or a gas phase. E.g., modifying the electrical bias may comprise reducing the electrical bias to zero when the phase of the flowing fluid is liquid. Advantageously, for example, in the case where the fluid-flow sensor is a gas flow sensor, switching off the fluid-flow sensor in the presence of a liquid may prevent damage to the sensor.

The method may comprise determining a power dissipated in the heater element. Determining the phase of the flowing fluid may comprise determining the phase of the flowing fluid based on the power dissipated in the heater element.

Determining the power dissipated in the heater element may comprise determining an average, and/or root mean square (RMS), power dissipated in the heater element.

In some examples, the method comprises determining a temperature of the heater element. For example, the temperature of the heater element may be determined based on the resistance of the heater element. In some examples, the temperature of the heater element may be determined by a temperature sensor, or based on a signal from a temperature sensor.

In some examples, the method may comprise determining a rate of temperature change of the heater element.

In some examples, the method comprises dividing the rate of temperature change of the heater element by the power dissipated in the heater element; and comparing the rate of temperature change of the heater element divided by the power dissipated in the heater element to one or more first known values. Determining the phase of the flowing fluid may comprise determining the phase of the flowing fluid based on the comparison between the rate of temperature change of the heater element divided by the power dissipated in the heater element and the one or more first known values.

The one or more first known values may comprise a threshold value of the rate of temperature change of the heater element divided by the power dissipated in the heater. In some examples, the one or more first known values may comprise a database of known values of the rate of temperature change of the heater element divided by the power dissipated in the heater for different known fluids.

In some examples, the method comprises determining a temperature of the flowing fluid.

In some examples, the method may comprise determining a rate of temperature change of the flowing fluid.

In some examples, the method comprises dividing the rate of temperature change of the flowing fluid by the power dissipated in the heater element; and comparing the rate of temperature change of the flowing fluid divided by the power dissipated in the heater element to one or more second known values. Determining the phase of the flowing fluid may comprise determining the phase of the flowing fluid based on the comparison between the rate of temperature change of the flowing fluid divided by the power dissipated in the heater element and the one or more second known values.

The one or more second known values may comprise a threshold value of the rate of temperature change of the flowing fluid divided by the power dissipated in the heater. In some examples, the one or more first known values may comprise a database of known values of the rate of temperature change of the flowing fluid divided by the power dissipated in the heater for different known fluids.

In some examples, the method comprises determining a heat transfer coefficient for the heater element. The method may further comprise comparing the heat transfer coefficient to one or more third known values. Determining the phase of the flowing fluid may comprise determining the phase of the flowing fluid based on the comparison between the heat transfer coefficient and the one or more third known values.

The one or more third known values may comprise a threshold heat transfer coefficient. In some examples, the one or more third known values may comprise a database of known heat transfer coefficients for different known fluids.

Also described herein is a controller for a fluid-flow sensor, the controller being configured to, when the fluid-flow sensor is in the presence of a flowing fluid: apply an electrical bias to a heater element of a fluid-flow sensor; determine a phase of the flowing fluid; and modify the electrical bias according to the phase of the flowing fluid.

For example, the phase of a flowing fluid may be a liquid or a gas. In some examples, the flowing fluid may undergo a change of phase (e.g. from liquid to gas, or from gas to liquid) while flowing.

Advantageously, the controller may enable a fluid-flow sensor to be capable of determining a rate and/or direction of fluid-flow regardless of the phase of the flowing fluid.

In some examples, the controller may be configured to switch off the fluid-flow sensor (i.e. reduce the bias to zero) when the fluid is in a liquid or a gas phase. E.g., the controller may be configured to modify the electrical bias by reducing the electrical bias to zero when the phase of the flowing fluid is liquid. Advantageously, for example, in the case where the fluid-flow sensor is a gas flow sensor, switching off the fluid-flow sensor in the presence of a liquid may prevent damage to the sensor.

Determining the power dissipated in the heater element may comprise determining an average, and/or RMS, power dissipated in the heater element.

In some examples, the controller is configured to determine a temperature of the heater element. For example, the temperature of the heater element may be determined based on the resistance of the heater element. In some examples, the temperature of the heater element may be determined by a temperature sensor, or based on a signal from a temperature sensor.

In some examples, the controller is configured to determine a rate of temperature change of the heater element. The controller may be further configured to divide the rate of temperature change of the heater element by the power dissipated in the heater element; and compare the rate of temperature change of the heater element divided by the power dissipated in the heater element to one or more first known values. Determining the phase of the flowing fluid may comprise determining the phase of the flowing fluid based on the comparison between the rate of temperature change of the heater element divided by the power dissipated in the heater element and the one or more first known values.

The one or more first known values may comprise a threshold value of the rate of temperature change of the heater element divided by the power dissipated in the heater. In some examples, the one or more first known values may comprise a database of known values of the rate of temperature change of the heater element divided by the power dissipated in the heater for different known fluids.

In some examples, the controller may be configured to determine a rate of temperature change of the flowing fluid. The controller may be further configured to divide the rate of temperature change of the flowing fluid by the power dissipated in the heater element; and compare the rate of temperature change of the flowing fluid divided by the power dissipated in the heater element to one or more second known values. Determining the phase of the flowing fluid may comprise determining the phase of the flowing fluid based on the comparison between the rate of temperature change of the flowing fluid divided by the power dissipated in the heater element and the one or more second known values.

The one or more second known values may comprise a threshold value of the rate of temperature change of the flowing fluid divided by the power dissipated in the heater. In some examples, the one or more first known values may comprise a database of known values of the rate of temperature change of the flowing fluid divided by the power dissipated in the heater for different known fluids.

In some examples, the controller is configured to determine a heat transfer coefficient for the heater element. The controller may be further configured to compare the heat transfer coefficient to one or more third known values. Determining the phase of the flowing fluid may comprise determining the phase of the flowing fluid based on the comparison between the heat transfer coefficient and the one or more third known values.

The one or more third known values may comprise a threshold heat transfer coefficient. In some examples, the one or more third known values may comprise a database of known heat transfer coefficients for different known fluids.

Also described herein is a device comprising a fluid-flow sensor and a controller as described herein.

According to some aspects of the present disclosure there is provided a flow sensor comprising a heater and a controller, where the controller is able to determine whether the fluid in contact with the flow sensor is a liquid or gas based on the signal from the heater, and modifies the bias applied to the heater depending on whether the fluid is a liquid or gas.

The controller is comprised in such a way that it has certain functionality. The controller is connected to the heater elements inside the sensor. Through these connections the controller can apply an electrical bias to the heater elements.

This electrical bias is controlled by the controller. The controller may control the electrical bias in a number of ways including but not limited to controlling the electrical voltage, controlling the electrical current, or controlling the duty cycle of a pulse width modulated electrical signal.

The controller is able to use the applied electrical bias to determine certain properties of the heater elements inside the sensor. The controller is able to determine the power dissipated in the heater element and the temperature of the heater element.

In one embodiment the heater elements are made of tungsten metal and the electrical bias is controlled by modulating the duty cycle of a pulse width modulated electrical signal. The power dissipated in the heater elements is determined by calculating the RMS voltage across the heater element and the RMS electrical current flowing through the heater element. By multiplying these values the average power dissipated in the heater element can be determined.

In another embodiment the sensor is driven with a constant controlled voltage. In another embodiment the heater is driven with a constant controlled current. In another embodiment the heater is driven in series with a current limiting resistor.

Furthermore, by taking the average voltage across the heater element and dividing by the average current flowing through the heater element the electrical resistance of the heater element can be determined. For a tungsten metal heater the relationship between electrical resistance and temperature is known and this can be used to determine the temperature of the heated element.

The controller is also connected to the temperature sensing elements inside the sensor. Through these connections the controller is able to determine the temperature of the temperature sensing elements.

In one embodiment the temperature sensing elements are made of tungsten metal and the controller measures their temperature in the same manner as the heater elements. In this case the applied electrical bias to the temperature sensing elements must be controlled to minimise the amount of electrical self-heating that occurs to avoid perturbing the temperature measurement.

The electrical bias may be controlled in a number of ways including but not limited to using a current limiting resistor, pulse width modulation of the driving signal, constant controlled voltage, constant controlled current, constant power or constant temperature.

The controller may use the temperature of the heater elements and/or the temperature sensing element to control the electrical bias applied to the heater elements. In one embodiment the controller uses the temperature of a heater element to control the electrical power dissipated in that heater element so as to maintain the heater element at a constant temperature.

The controller monitors the relationship between the heater power, heater temperature and the temperature of the temperature sensing elements. The controller uses the relationship between these parameters to determine if the sensor is exposed to liquid flow or gas flow.

In another embodiment a proxy parameter that is influenced by power or temperature is used to control the heater and temperature sensing elements rather than power or temperature themselves. This could include voltage, current or electrical resistance.

If the sensor is exposed to liquid flow the electrical power dissipated in the heater element will be much higher for a given heater temperature and fluid temperature than it would be if the sensor was exposed to gas flow.

In one approach the temperature of a temperature sensing element is subtracted from the temperature of a heater element to find a temperature difference. The average RMS power dissipated in the heater element is divided by this temperature difference to determine a heat transfer coefficient. This heat transfer coefficient is compared against a threshold to determine whether the flow in the sensor is a liquid or a gas.

It should be noted that the actual heat transfer coefficient doesn't need to be calculated, but any value that corresponds to heat transfer coefficient can be used. Instead if a relevant signal is received from the heater, or a temperature sensing element then that signal, or a derivative of that signal that would correspond to the heat transfer coefficient. Such a signal could be voltage, current, power, temperature, or resistance.

In another approach the temperature of the heater element is measured over time and the power dissipated in the heater element is measured over time. The rate of change of temperature is calculated and divided by the average RMS power dissipated in the heater element. This value is compared against a threshold to determine whether the flow in the sensor is a liquid or a gas.

It should be noted that it is not the actual rate of change of temperature that needs to be calculated or measured. Any other value that corresponds to this can also be used, such as rate of change of voltage, current, resistance etc.

In another approach the temperature of one or more heating elements or temperature sensors is measured over time and the power dissipated in the heater element is measured over time. The rate of change of temperature in one or more of these elements is calculated and divided by the average RMS power dissipated in the heater element. This value is compared against a threshold to determine whether the flow in the sensor is a liquid or a gas.

Once the controller has determined whether the flow is a liquid or a gas it can adjust the control of the heater element accordingly.

In order to get a sufficiently large signal for accurate and precise measurement of gas flow it is necessary for the controller to drive the heated element to a high temperature of around 200 degrees Celsius. In contrast for measuring liquid flow the required temperature of the heated element is much lower, around 60 degrees Celsius. This can create a problem when transitioning between measuring gas flow and measuring liquid flow. Having liquid come into contact with a heated element at high temperature can create large thermal gradients and the liquid can boil.

Boiling liquid can create physical and thermal stresses on the dielectric membrane which may cause the membrane to fail or shorten its operating life.

Large thermal gradients across the heated elements can cause local hotspots which might be at a much higher temperature than the average temperature of the heater. This can cause the heater to be locally damaged. To address this the controller may limit the maximum amount of power that can be dissipated in the heated element once liquid has been detected. The controller may reduce the target heater temperature in the case of a closed loop temperature controlled heating element. The controller may turn off the heater for a period of time. The controller may switch to a mode where the power to the heater is controlled to a safe level and the temperature of the heater and temperature sensors are used to determine the flow rate.

Corrosion is another common issue when exposed to liquids. Liquids with dissolved ions that can come into contact with energised metallic components can cause corrosion through electrolysis of the metallic components. This can shorten the life of the sensor dramatically. Mixtures of different fluids can in some cases be worse than either fluid individually when it comes to the speed of corrosion.

The controller may mitigate the damage from corrosion by operating the sensor in a pulsed mode while liquid is detected. The frequency and length of the pulse can vary. For example the pulse width may be a few milliseconds, and the time period between pulses could be a few seconds, a minute, or a few minutes, or more. For example, when using the flow sensor to detect flow of gas, sometimes some liquid may also enter the flow sensor—in such case the sensor can detect when liquid is present is the sensor, switch to a pulsed mode. By only energising the sensor for a short period of time and only energising the sensor periodically the rate of electrolytic corrosion can be reduced and the life of the sensor can be extended. By periodically energising and measuring the power dissipated in the heated elements and the temperature of the heated and temperature sensing elements the controller can determine when the sensor is no longer in contact with liquid. Based on this information the controller can return to a normal mode of operation immediately or after the sensor has been dry for a certain length of time.

In a simpler embodiment, when the controller detects liquid, the sensor is powered off, and remains power off until an external signal to the controller commands it to restart the sensor.

In some non-limiting examples, the method and/or the controller according to the present disclosure may be suitable for use with a fluid-flow sensor according to one or more of the following examples:

A flow and thermal conductivity sensor comprising: a semiconductor substrate comprising an etched portion; a dielectric region located on the substrate, wherein the dielectric region comprises at least one dielectric membrane located over the etched portion of the semiconductor substrate; and a heating element located within the dielectric membrane. The membrane may also have one or more recessed regions.

The dielectric region may comprises a dielectric layer or a plurality of layers including at least one dielectric layer. The heating element may be fully embedded or partially embedded within the dielectric membrane. The at least one recessed region may comprise one or more discontinuous regions where the thickness of the dielectric membrane is discontinuous or varies from an average or most common dielectric membrane thickness.

Generally speaking, a dielectric membrane region may be located immediately adjacent to the etched portion of the substrate. The dielectric membrane region corresponds to the area of the dielectric region above the etched cavity portion of the substrate. Each dielectric membrane region may be over a single etched portion of the semiconductor substrate.

The disclosed sensor could also be used as a gas sensor and be applicable to a variety of gases and liquids, but we make specific reference to Carbon dioxide ($CO_2$), methane and hydrogen as these specific gases have thermal conductivity properties which are significantly different from those of air. Although we make specific reference to thermal conductivity as the thermo-mechanical property allowing discrimination between fluids, the disclosed devices could utilise any other thermo-mechanical property. The disclosed device could be used, for example, in a breathalyser where flow and $CO_2$ concentration could be measured concomitantly. The disclosed device could also be used in other healthcare, fluidic, consumer, environmental, or smart home applications.

The flow sensor may have incorporated within the same device or chip and optionally within the same membrane, a thermal conductivity sensor based on at least one temperature sensing element. The device is able to concomitantly sense properties of the fluid flow such as speed, mass, volume, shear stress as well as the composition of the flow (e.g., whether the fluid, in this case, the gas, has a certain $CO_2$ or hydrogen or methane percentage/ppm within air).

The heater temperature may be modulated depending on the fluid phase by applying different power levels to increase sensitivity and selectivity to different fluid phases based on their thermal conductivity variation with temperature.

The heater may be operated in a pulse mode (e.g. driven with a square wave, sinusoidal wave, Pulse Width Modulated wave, Pulse Density Modulation, etc.) or continuous mode. The pulse mode has, among others, the advantage of reduced power consumption, reduced electromigration for enhanced device reliability/lifetime and improved fluid properties sensing capabilities.

The heating element may be configured to operate as a sensing element, by for example sensing the change in the resistance due to the change in temperature. The heating element may operate simultaneously as both a heating element and a sensing element. The heating element is electrically equivalent to a resistor. The thermal conductivity of most heaters materials (Tungsten, Titanium, Platinum, Aluminium, polysilicon, monocrystalline silicon) varies with temperature. This variation is mostly linear and is characterised by the TCR (Temperature coefficient of resistance). The TCR can be positive or negative, but most metals have a positive and stable TCR, meaning that their resistance increases when the temperature is increased. When current flows through the heating element, the heating element becomes hot, heating the membrane around it. If the heater is operating at the same power, as the fluid flows above the heater, it cools down the heater, due to convection, modifying its resistance (lower resistance for a positive TCR). The heater could also be driven in constant resistance or constant temperature modes and one can associate the change in the power needed to maintain the heater resistance or temperature of the heater the same in the presence of the flow. The sensor may be able to measure the properties of a flow such as flow rate, velocity, mass or volume flow rates as well as the composition of the fluid. The device may be configured to measure flow properties such as flow rate, velocity, mass or volume flow rates by means of sensing the change in the temperature, the change in the voltage, when supplied to a constant current, or the change in the power when the heater is operated in a constant temperature or constant resistance mode.

Alternatively, the flow could be measured by employing one or more sensing elements (such as temperature sensitive elements or temperature sensors). Preferably two sensing elements may be placed on either side of the heater within the same dielectric membrane and optionally used as a differential pair. The differential pair may be formed of one upstream sensing element and one downstream sensing element. Optionally, holes or discontinuities may be placed between the heater and the sensing elements.

The one or more temperature sensing elements may be configured to measure a differential value across the heating element. For example, they may be used to measure a change in temperature across the heating element. At least one thermopile may be placed symmetrically around/across the heater, and the voltage difference between the thermopile terminals may be indicative of the flow properties, while the sign of the voltage may be indicative of the direction of the flow.

At least one temperature sensing elements may be configured to measure a differential value between the dielectric membrane and the dielectric region above the semiconductor substrate. For example, a thermopile may be arranged to have its hot junction located on the dielectric membrane and its cold junction located on the dielectric region above the semiconductor substrate i.e. outside the dielectric membrane region.

Two thermopiles may be arranged on either side of the heating element, both with their hot junctions located on the dielectric membrane and their cold junctions located outside the dielectric membrane region. As both sets of cold junctions outside the dielectric membrane would be at substantially the same temperature, the difference between the two hot junctions could be used to measure a change in temperature across the heating element. The cold junctions of the at least two thermopiles may be placed outside the membrane and connected together physically or electrically.

The temperature sensing elements may comprise resistive temperature detectors, diodes, and/or thermopiles. Thermopiles may be used measure a temperature difference between the dielectric membrane and the dielectric region above the substrate, or may be used to measure a temperature difference across the heating element. Compared to the thermopiles, diodes and detectors have reduced thermal losses to the semiconductor substrate as they are located completely on or within the dielectric membrane. One type of sensing element may be used or a combination of different types of sensing elements may be used.

The temperature sensing elements may be any of resistive temperature detectors, bolometers, diodes, transistors or thermopiles, or an array in series or parallel or a combination of those.

The temperature sensing elements can also be made of thermopiles. A thermopile comprises one or more thermocouples connected in series. Each thermocouple may comprise two dissimilar materials which form a junction at a first region of the membrane, while the other ends of the materials form a junction at a second region of the membrane or in the heat sink region (substrate outside the membrane area), where they are connected electrically to the adjacent thermocouple or to pads for external readout. The thermocouple materials may comprise a metal such as aluminium, tungsten, titanium or combination of those or any other metal available in the process. Alternatively the thermocouple materials may comprise thermocouples based on n-type and p-type silicon or polysilicon or combinations of metals and semiconductors. The position of each junction of a thermocouple and the number and the shape of the thermocouples may be any required to adequately map the temperature profile distribution over the membrane to achieve a specific performance.

The choice of the shape, position and number of temperature sensing elements, the heating elements and the recesses within the membrane may generate the temperature profile and/or map the temperature profile distribution over the membrane to achieve a specific performance, and can result in multi-directional, multi-range, multi-properties sensing capabilities. For instance, the flow sensor may be designed to sense both flow rate and flow direction, or flow rate, flow direction and fluid composition based on thermal conductivity, or any other combination of fluid properties.

The sensing elements formed within the dielectric membrane, may be configured as a temperature resistor detector (TRD) or a bolometer, a diode, a transistor or an array of transistors or diodes for enhanced sensitivity and selectivity.

The temperature sensing elements could be used in a differential way to sense (i) the flow properties, such as velocity, flow rate, volume or mass flow rates of the flow (by measuring the signal difference between the upstream and the downstream sensing elements) or (ii) the flow composition based on the difference in the thermal conductivity between different components of the fluid (e.g. hydrogen has a much higher thermal conductivity than air; CO2 has a lower thermal conductivity than air).

The heater or heating element may also be used as a temperature sensing device. The heat exchange between the heater and the fluid can then be measured through the change in the resistance of the heater itself, and correlated to the at least one property of the fluid (e.g. velocity, flow rate, flow mass or volume flow rates, exerted wall shear stress, pressure, temperature, direction).

In use, the heating element may extend in a direction perpendicular to the direction of flow through the sensor. The heating element may not be at an exact right angle to the direction of flow, and may extend in a diagonal direction or at an acute angle to the direction of flow however one component of the extension of the heating element may be perpendicular to the flow. Optionally, the heating element may be substantially perpendicular or may be arranged at an angle within 10° to the direction perpendicular to the flow through the sensor.

The temperature sensing elements may be formed as long elements which may be aligned to either the first or the additional/second heater depending if their primary purpose is to sense properties of the flow such as flow rate or speed or if their primary purpose is to sense the composition of the fluid and the concentrations of different components of the fluid respectively.

The dielectric membrane may be circular. The heating element and sensing elements may also be circular. This improves the mechanical stability of the membrane.

The sensor may further comprise an application specific integrated circuit (ASIC) coupled to the sensor. The ASIC may be located underneath the sensor, for example using a die stack technique. Alternatively, the ASIC may be located elsewhere. The ASIC may be connected to the sensor using wire bonding and pads, or using through-silicon-vias (TSV) extending through the semiconductor substrate.

An ASIC may be provided within the same system or the same package or on-chip to provide electronic circuitry to drive, read-out signals and process signals from the sensor. The ASIC may be placed in a stack die configuration under the sensor and the sensor and ASIC are placed within a manifold.

Analogue/digital circuitry may be integrated on-chip. Circuitry may comprise IPTAT, VPTAT, amplifiers, analogue to digital converters, memories, RF communication circuits, timing blocks, filters or any other mean to drive the heating element, read out from the temperature sensing elements or electronically manipulate the sensor signals. For example, it is demonstrated that a heating element driven in constant temperature mode results in enhanced performance and having on-chip means to implement this driving method would result in a significant advancement of the state-ofthe-art flow sensors. The driving method known as 3*w* may be implemented via on-chip means, or any other driving method, such as constant temperature difference and time of flight, needed to achieve specific performance (e.g. power dissipation, sensitivity, dynamic response, range, fluid property detection, etc.). In absence of on-chip circuitry, this disclosure also covers the off-chip implementation of such circuital blocks when applied to a flow sensor having one or more features described in any of the previous embodiments. Such off-chip implementation may be done in an ASIC or by discrete components, or a mix of the two.

The device may be packaged in a metal TO type package, in a ceramic, metal or plastic SMD (surface mount device) package. The device may also be packaged directly on a PCB, or with a flip-chip method. The device may also be embedded in a substrate, such as a customised version of one of the previously mentioned package, a rigid PCB, a semi-rigid PCB, flexible PCB, or any other substrate, in order to have the device surface flush with the substrate surface. The package can also be a chip or wafer level package, formed for example by wafer-bonding.

The device may also be assembled within a manifold which provides an inlet, outlet and a pre-defined channel through which the fluid flow takes place. The manifold provides protection to the device as well as allowing easier and more controllable measurement of the flow or the fluid composition. The ASIC or external read-out circuitry may also be placed in the same manifold in a lateral or die stack configuration.

The flow sensor may have through silicon vias (TSV), to avoid the presence of bond wires in proximity of the sensitive area of the device which might affect the flow sensor readings. Advantageously, a flow sensor with TSV can enable 3D stacking techniques. For instance the flow sensor chip can sit on top of an ASIC, thus reducing the sensor system size.

The semiconductor substrate may be silicon and the dielectric membrane may be formed mainly of oxide and nitride materials and where the heater is made of a metal such as tungsten, titanium, copper, aluminium, gold, platinum or a combination of those or a semiconductor such as highly doped n type or p type silicon or polysilicon and where the heater has a shape of a meander, spiral or a hotwire.

The starting substrate may be any semiconductor such as silicon, silicon on insulator (SOI), Silicon Carbide, Sapphire or Diamond. In particular the use of silicon is advantageous, as it guarantees sensor manufacturability in high volume, low cost and high reproducibility. The use of a silicon substrate could also enable on-chip circuitry for sensor performance enhancement and system integration facilitation. Such on-chip circuitry could be implemented by using analogue or digital or mixed-signal blocks placed outside the dielectric membrane.

The dielectric membrane or multiple membranes may be formed by back-etching using Deep Reactive Ion Etching (DRIE) of the substrate, which results in vertical sidewalls and thus enabling a reduction in sensor size and costs. However, the back-etching can also be done by using anisotropic etching such as KOH (Potassium Hydroxide) or TMAH (TetraMethyl Ammonium Hydroxide) which results in slopping sidewalls. The dielectric layers within the membrane which could be formed by oxidation or oxide deposition could be used as an etch stop during the DRIE or wet etching processes. The membrane can also be formed by a front-side etch or a combination of a front-side and back-side etch to result in a suspended membrane structure, supported only by two or more beams. The membrane may be circular, rectangular, or rectangular shaped with rounded corners to reduce the stresses in the corners, but other shapes are possible as well. Additionally holes may be formed within the membrane to reduce the thermal dissipation via the heat conduction through the dielectric membrane and enhance the heat loss via heat convention and conduction in the regions below and above the membrane, and optionally in the path of the fluid (above the membrane). Optionally the holes or discontinuities may be made by front etching after the membrane is formed.

The dielectric membrane may comprise silicon dioxide and/or silicon nitride. The membrane may also comprise one or more layers of spin on glass, and a passivation layer over the one or more dielectric layers. The employment of materials with low thermal conductivity (e.g. dielectrics) enables a significant reduction in power dissipation as well as an increase in the temperature gradients within the membrane with direct benefits in terms of sensor performance (e.g. sensitivity, frequency response, range, etc.). Temperature sensing elements or heaters made of materials such as monocrystalline or polycrystalline semiconductors or metals could be suspended or embedded in the dielectric membrane.

The membrane may also have other structures made of metal or other conductive or other materials with higher mechanical strength. These structures can be embedded within the membrane, or may be above or below the membrane, to engineer the thermo-mechanical properties (e.g. stiffness, temperature profile distribution, etc.) of the membrane and/or the fluid dynamic interaction between the fluid and the membrane. More generally these structures can be also outside the membrane and/or bridging between inside and outside the membrane.

The fluid sensed may be a gas, and the gas may be made of air and the components of interest could be any of $CO_2$, methane or hydrogen or other gases that have different thermal conductivity than that of air. The fluid can also be a liquid.

The substrate may comprise: more than one etched portion; a dielectric region located on the substrate, wherein the dielectric region comprises a dielectric membrane over each area of the etched portion of the substrate. At least one membrane may contain any combination of the features described above. A second membrane may employ more holes or discontinuities, a larger area of holes or discontinuities, or holes or discontinuities at a different location. A differential signal can be measured between a sensing element on the first membrane and a sensing element placed on the second membrane to detect the composition of the fluid in addition to the flow properties of the fluid.

In some examples, the method and/or the controller of the present disclosure may be suitable for use with a sensor of the kind described in US 2021/0116281, the contents of which are hereby incorporated by reference in their entirety.

BRIEF DESCRIPTION OF FIGURES

Some embodiments of the disclosure will now be described by way of example only and with reference to the accompanying drawings, in which.

DETAILED DESCRIPTION

Figure 1:
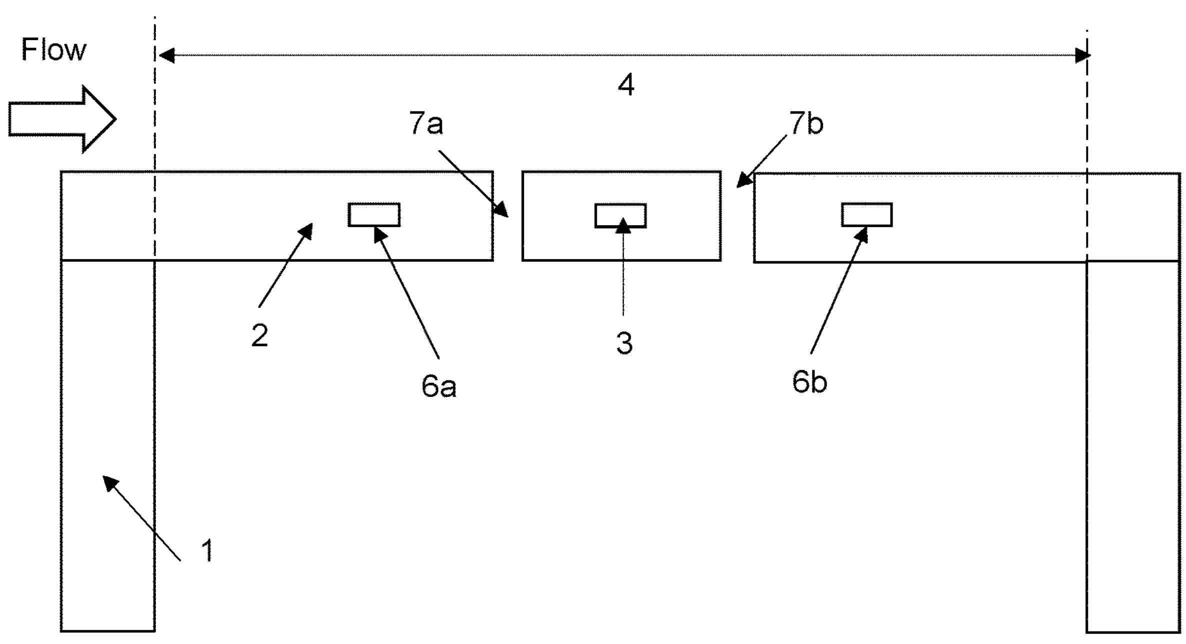
FIG. 1 shows a cross-section of a state-of-the-art flow sensor based on a heating and self-sensing element.
Figure 2:
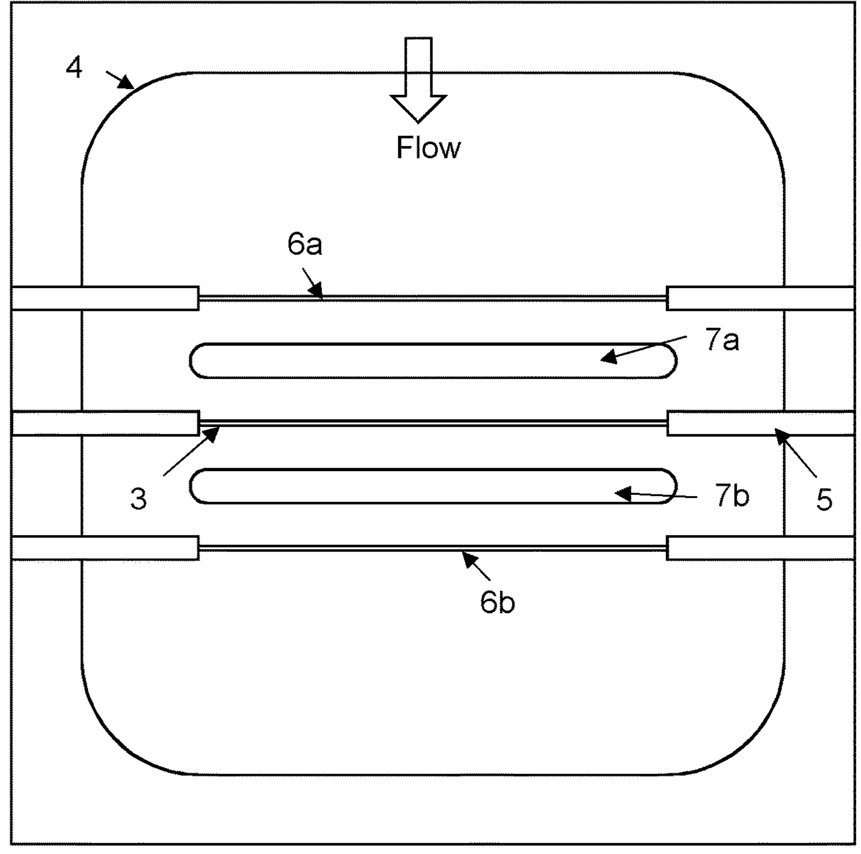
FIG. 2 shows a top view of a state-of-the-art flow sensor based on a heating and self-sensing element.

FIG. 1 (cross-section) and FIG. 2 (top view) illustrate a prior art flow sensor based on a heating and a self-sensing element. The device has a substrate 1, which could be based on a semiconductor material such as silicon, a membrane 4 which incorporates one or more dielectric layers 2 (e.g. oxides and/or nitrides) and a heater (e.g. heater element) 3. The heater 3 may comprise a hot wire (e.g. tungsten, platinum, titanium). The membrane 4 is defined by back etching (as shown) or front etching using dry or wet etching techniques. When the fluid passes over the top of the membrane 4, the heater 3 cools down due to heat convention losses. This could be simply measured by associating the change in the resistance of the heater with the flow rate, speed, volume or mass flow rates. Alternatively, as illustrated in FIGS. 1 and 2, the sensor may comprise one or more temperature sensing elements 6*a*, 6*b*. For example, as illustrated in FIGS. 1 and 2, a first temperature sensing element 6*a* may be situated upstream of the heater 3, and a temperature second sensing element 6*b* may be situated downstream of the heater 3. The temperature sensing elements 6*a*, 6*b* may be configured to measure a differential value (e.g. a change in temperature) across the heater 3. The heater 3 and the temperature sensing elements 6*a*, 6*b* are connected externally through connections and/or pads 5 (shown in FIG. 2), e.g. biasing tracks. Alternatively, the heater 3 could be maintained in a constant temperature or constant resistance mode by modifying the power supplied to the heater 3. In this case, one can measure the change in the power due to the flow rate, velocity, volume or mass flow rates.

In examples, the temperature sensing elements 6*a*, 6*b* may comprise resistive temperature detectors, diodes, and/or thermopiles.

As further illustrated in FIGS. 1 and 2, the membrane 4 may comprise one or more recessed regions (also described herein as holes and/or discontinuities) 7*a*, 7*b*, which may reduce the thermal dissipation via the heat conduction through the membrane 4 and enhance the heat loss via heat convention and conduction in the regions below and above the membrane 4. A first recessed region 7*a* may be situated upstream of the heater 3. A second recessed region 7*b* may be situated downstream of the heater 3.

Figure 3:
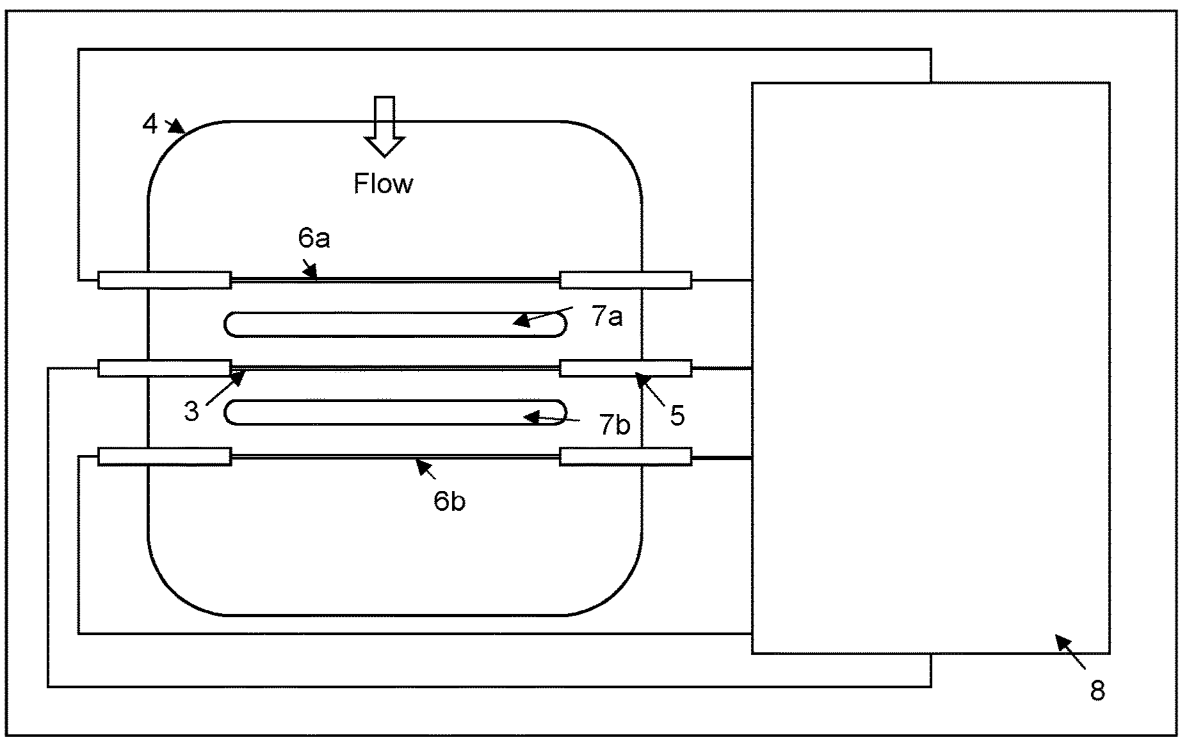
FIG. 3 illustrates schematically the controller integrated with the state of the art sensor.
Figure 4:
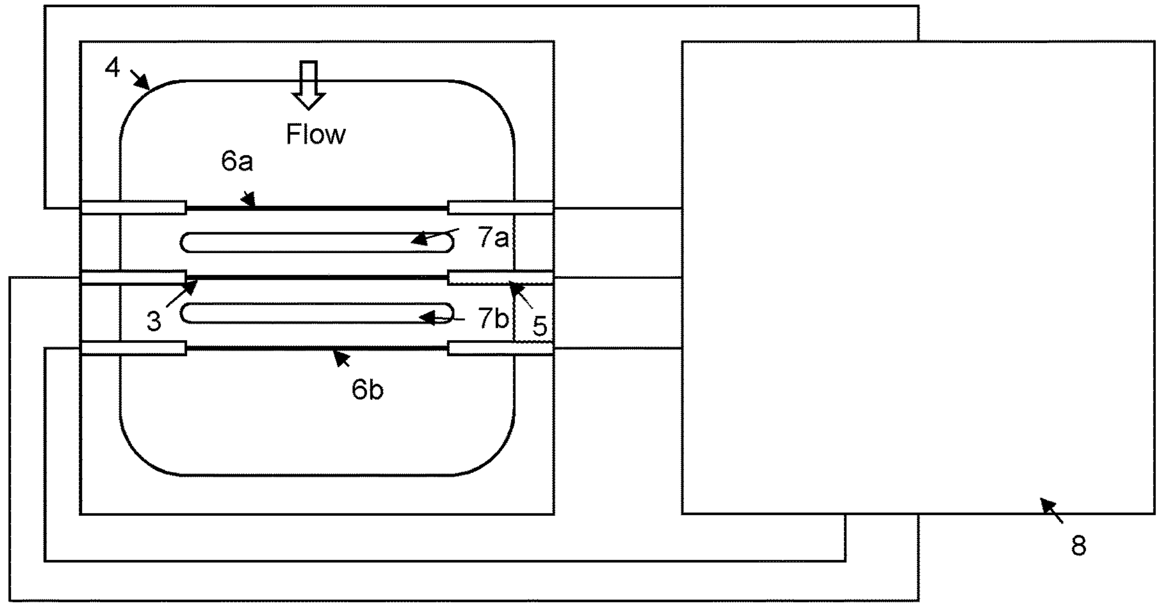
FIG. 4 illustrates schematically a separate controller connected to a state of the art sensor.

FIGS. 3 and 4 illustrate example embodiments according to the present invention. The device illustrated in FIGS. 3 and 4 comprises a prior art flow sensor, for example as illustrated in FIGS. 1 and 2, connected to a controller 8. The controller 8 controls the electrical bias applied to the heater 3 and temperature sensing elements 6*a*, 6*b* and measures the RMS voltage and RMS current applied to the heater 3 and/or the temperature sensing elements 6*a*, 6*b* to determine the power and temperature of the heater 3 and/or the temperature sensing elements 6*a*, 6*b*. In FIG. 3 the controller 8 is incorporated with the sensor in the same enclosure. In FIG. 4 the controller 8 is separate from the sensor but connected to the heater 3 and the temperature sensing elements 6*a*, 6*b* by wires or PCB traces.

As described herein, an "element" may refer to a heater 3 (heater element) and/or a temperature sensing element 6*a*, 6*b*.

Figure 5:
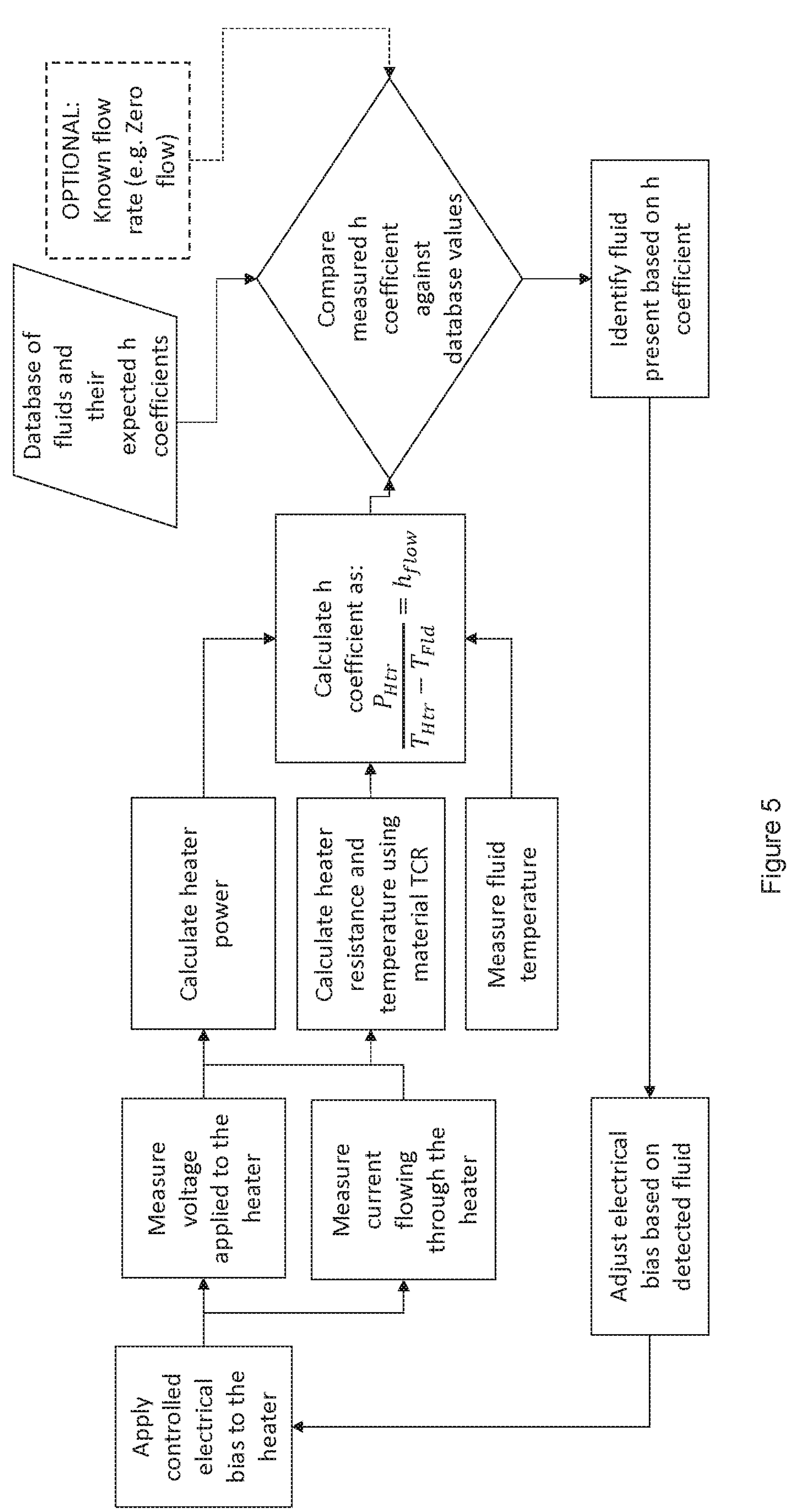
FIG. 5 illustrates a control flow chart for calculating heat transfer coefficient and comparing to a threshold to determine liquid or gas.

FIG. 5 illustrates a flowchart that details how the controller applies an electrical bias and determines the power dissipated in each element and the temperature of the elements by measuring the voltage and current applied to them. The power and temperature can then be used to calculate the heat transfer (h) coefficient for the element. This h coefficient can then be compared to a threshold determined from experimentation to identify whether the sensor is exposed to liquid or gas. Finally, once the controller has determined whether the sensor is exposed to liquid or gas it uses that information to adjust the electrical bias applied to the sensor elements in order to avoid overheating the elements and to optimise the sensitivity of the sensor to changes in flow rate.

Figure 6:
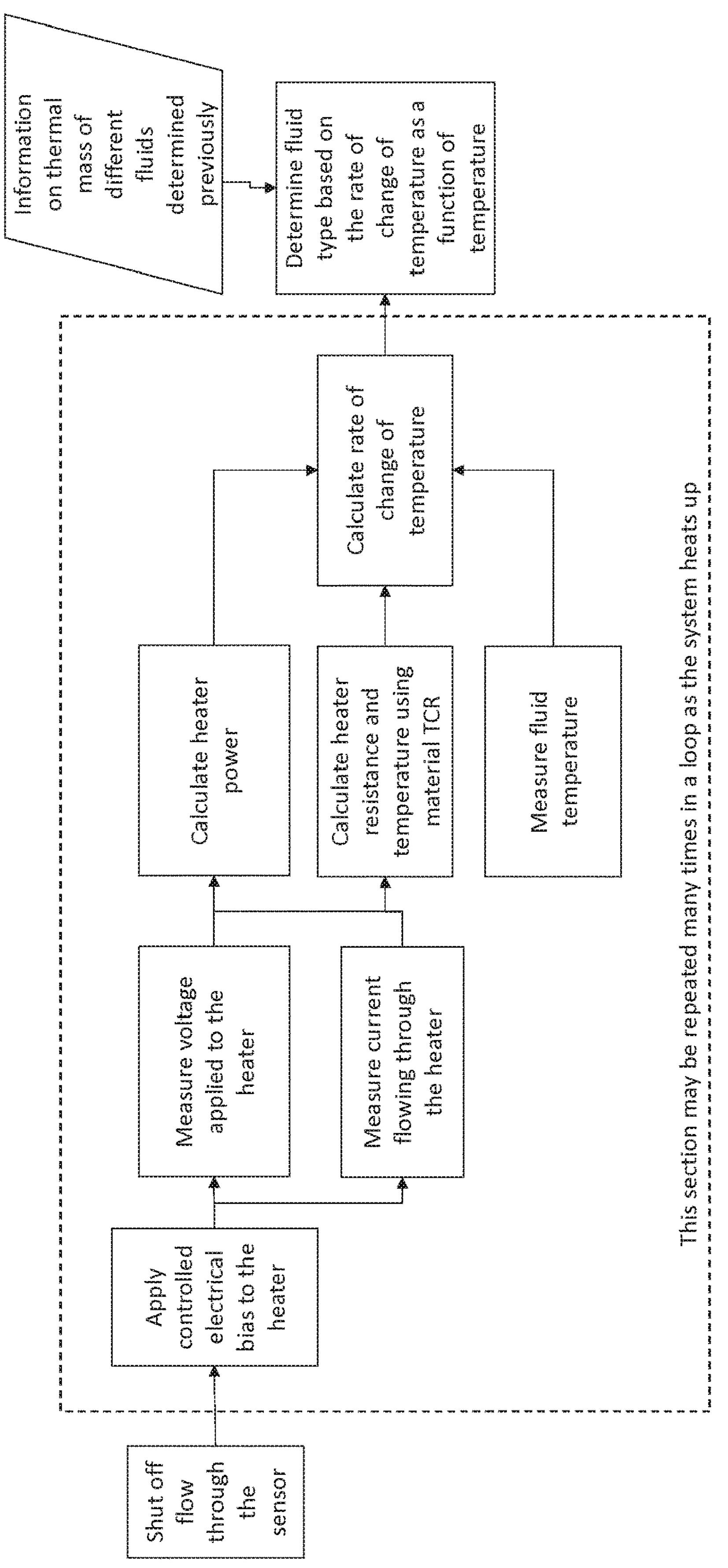
FIG. 6 illustrates a control flow chart for calculating rate of change of temperature and comparing to a threshold to determine liquid or gas.

FIG. 6 illustrates a flowchart that details how the controller applies an electrical bias to the heater and determines the power dissipated in each element and the temperature of each element. The controller applies an electrical bias that causes the heater and the surrounding fluid to heat up. The temperature sensing elements measure the fluid temperature as the heater element causes the temperature to rise. The controller calculates the rate of temperature change. The controller compares the relationship between the rate of temperature change and the applied electrical bias to the heater with known information collected previously to identify the fluid present. The controller can then use this information to adjust the electrical bias used during flow sensing in order to avoid overheating the elements and to optimise the sensitivity of the sensor to changes in flow rate.

Figure 7:
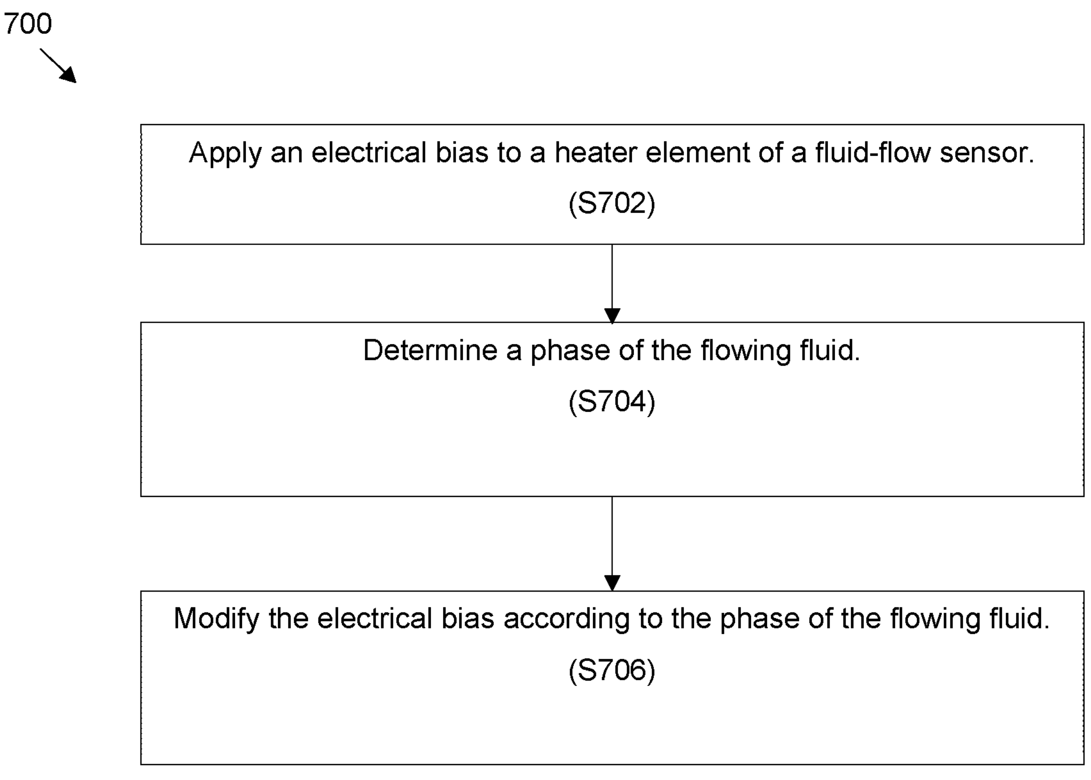
FIG. 7 illustrates a method according to the present disclosure.

FIG. 7 illustrates an example of a method 700 according to the present disclosure. The method 700 may be carried out by a controller according to the present disclosure. For example, one or more steps of the method 700 may be provided as instructions to the controller, for example in the form of computer code.

In a step S702 of the method 700, an electrical bias is applied to a heater element of a fluid-flow sensor.

In a step S704 of the method 700, a phase of the flowing fluid is determined.

In a step S706 of the method 700, the electrical bias is modified according to the phase of the flowing fluid.

As described herein, the controller 8 may be configured to carry out the methods (e.g. the method 700 illustrated in FIG. 2) and/or the processes (e.g. the processes illustrated in FIGS. 5 and 6) described herein. For example, the controller 8 may be configured to execute instructions (e.g. in the form of computer program code) as described herein. The instructions may be provided on one or more carriers. For example there may be one or more non-transient memories, e.g. a EEPROM (e.g. a flash memory) a disk, CD- or DVD-ROM, programmed memory such as read-only memory (e.g. for Firmware), one or more transient memories (e.g. RAM), and/or a data carrier(s) such as an optical or electrical signal carrier. The memory/memories may be integrated into a corresponding processing chip and/or separate to the chip. Code (and/or data) to implement embodiments of the present disclosure may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language.

The present disclosure may be further defined according to one or more of the following non-limiting clauses:

1. A flow sensor comprising a heater and a controller, where the controller is able to determine whether the fluid in contact with the flow sensor is a liquid or gas, and modifies the bias applied to the heater depending on whether the fluid is a liquid or gas.
2. A flow sensor according to clause 1 where the controller uses the heat transfer coefficient to determine if the fluid is a liquid or gas.
3. A flow sensor according to clause 1 where the controller uses the rate of change of heater temperature to determine if the fluid is a liquid or gas.
4. A flow sensor according to clause 1 where the controller operates the heater at a higher temperature when the fluid is a gas, and a lower temperature when the fluid is a liquid
5. A flow sensor according to clause 1 where the controller operates the heater when gas is present, but turns it off when liquid is detected.
6. A flow sensor according to clause 5 where the controller having turned off the heater in presence of liquid, then turns on the heater after getting an external signal.
7. A flow sensor according to clause 5 where the controller periodically energises the heater to determine if liquid is still present.
8. A flow sensor according to clause 1 comprising a substrate with an etched portion, a dielectric above the substrate, the region of the dielectric above the etched portion being a dielectric membrane, and a heater embedded within the dielectric membrane.
9. A flow sensor according to clause 1, where the controller uses a signal from the heater to determine whether the fluid in contact is a liquid or gas.
10. A flow sensor according to clause 1, where there are one or more temperature sensing elements within the sensor.
11. A flow sensor according to clause 10, where the controller uses a signal from the one or more temperature sensing element within the sensor.
12. A flow sensor according to clause 10, wherein the controller uses a signal from both the heater and the temperature sensing elements to determine whether the fluid in contact is a liquid or gas.

Generally, any of the functions described herein can be implemented using software, firmware, hardware (e.g., fixed logic circuitry), or a combination of these implementations.

Although the disclosure has been described in terms of preferred embodiments as set forth above, it should be understood that these embodiments are illustrative only and that the claims are not limited to those embodiments. Those skilled in the art will be able to make modifications and alternatives in view of the disclosure which are contemplated as falling within the scope of the appended claims. Each feature disclosed or illustrated in the present specification may be incorporated in the disclosure, whether alone or in any appropriate combination with any other feature disclosed or illustrated herein.

Many other effective alternatives will occur to the person skilled in the art. It will be understood that the disclosure is not limited to the described embodiments, but encompasses all the modifications which fall within the spirit and scope of the disclosure.

LIST OF REFERENCE NUMERALS

1 Semiconductor substrate
2 Dielectric layers(s)
3 Heater
4 Membrane
5 Connections
**6*a*, 6*b*** Temperature sensing elements
**7*a*, 7*b*** Recessed regions
8 Controller

The invention claimed is:

1. A method for controlling a fluid-flow sensor in the presence of a flowing fluid, the method comprising:
applying an electrical bias to a heater element of the fluid-flow sensor;
determining a heat transfer coefficient for the heater element;
comparing the heat transfer coefficient to one or more third known values;
determining a phase of the flowing fluid based on comparing the heat transfer coefficient to the one or more third known values; and
modifying the electrical bias according to the phase of the flowing fluid.

2. A method according to claim 1, wherein modifying the electrical bias comprises reducing the electrical bias to zero when the phase of the flowing fluid is liquid.

3. A controller for a fluid-flow sensor, the controller being configured to, when the fluid-flow sensor is in the presence of a flowing fluid:
apply an electrical bias to a heater element of the fluid-flow sensor;
determine a heat transfer coefficient for the heater element;
compare the heat transfer coefficient to one or more third known values;
determine a phase of the flowing fluid based on the comparing the heat transfer coefficient to the one or more third known values; and
modify the electrical bias according to the phase of the flowing fluid.

4. A device comprising:
a fluid-flow sensor; and
a controller according to claim 3.

* * * * *